(12) United States Patent
Ke et al.

(10) Patent No.: US 7,095,716 B1
(45) Date of Patent: Aug. 22, 2006

(54) INTERNET SECURITY DEVICE AND METHOD

(75) Inventors: Yan Ke, San Jose, CA (US); Yuming Mao, Milpitas, CA (US); Jian Tong, San Jose, CA (US); Guangsong Huang, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 956 days.

(21) Appl. No.: 10/112,924

(22) Filed: Mar. 28, 2002

Related U.S. Application Data

(60) Provisional application No. 60/280,684, filed on Mar. 30, 2001.

(51) Int. Cl.
*H04J 1/16* (2006.01)
(52) U.S. Cl. ...................... 370/230; 370/396
(58) Field of Classification Search ............... 370/230, 370/255, 389, 391, 392, 393, 395.1, 396, 370/395.31, 395.52, 395.42, 395.5, 395.53, 370/401, 402, 411, 428, 429, 229, 235, 386
See application file for complete search history.

(56) References Cited

U.S. PATENT DOCUMENTS 6,798,788 B1 * 9/2004 Viswanath et al. ......... 370/469
6,950,434 B1 * 9/2005 Viswanath et al. ......... 370/392

* cited by examiner

*Primary Examiner*—Brenda Pham
(74) *Attorney, Agent, or Firm*—Harrity Snyder LLP

(57) ABSTRACT

Methods and apparatus, including computer program products, implementing and using techniques for processing a data packet. An input port receives a data packet, a switching board classifies the data packet, determines whether the data packet should be accepted, and switches the data packet to a management board if the data packet is a first data packet in a session, and to a processing board if the data packet is not a first data packet in a session. A management board receives a data packet from the switching board, examines the data packet and forwards the data packet to one of the processing boards. One or more processing boards receives non-first data packets from the switching board and data packets from the management board and processes the data packets. A firewall and a secure gateway with firewall and virtual private network functionality for processing a data packet are also described.

19 Claims, 7 Drawing Sheets

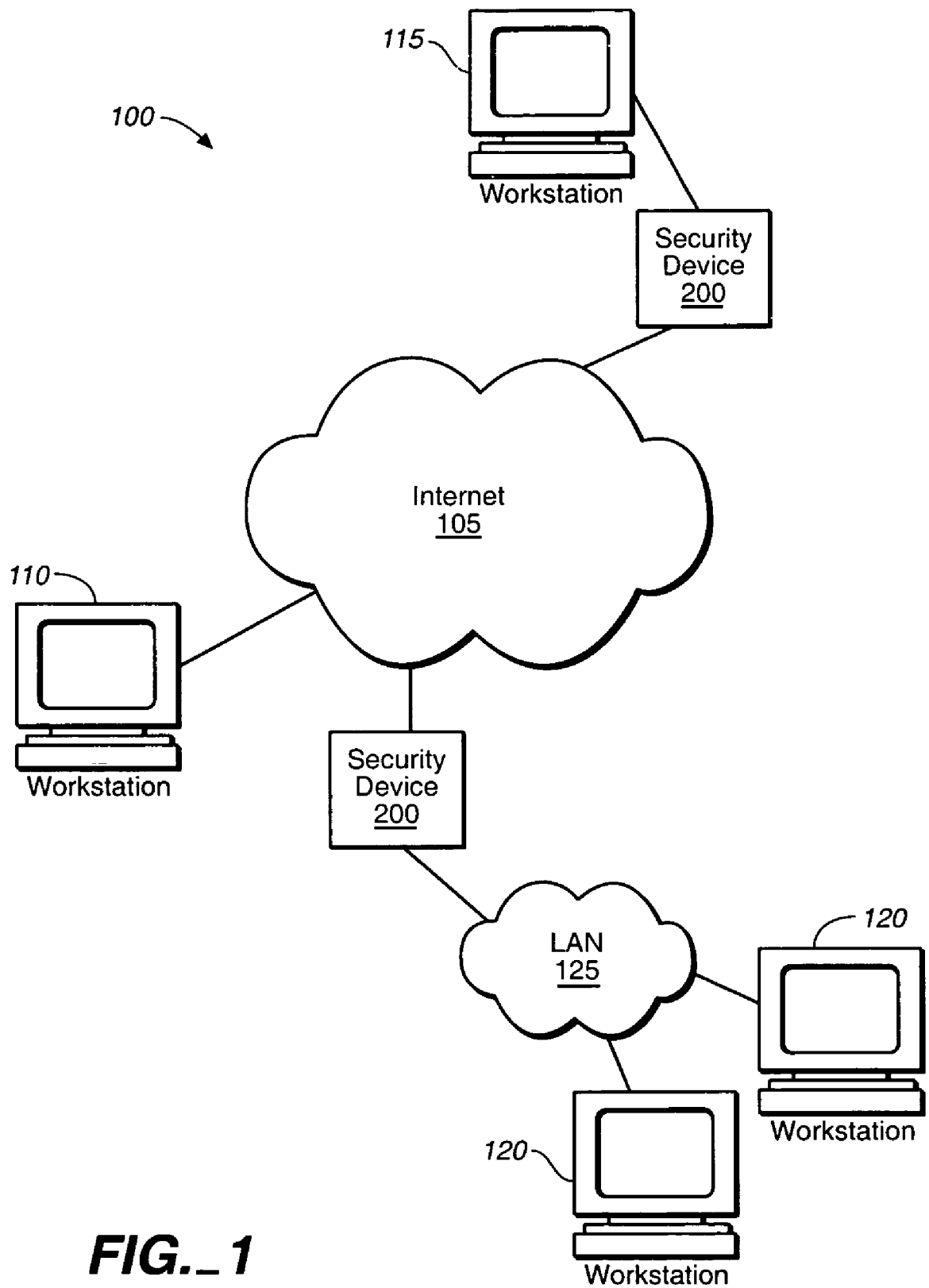
FIG._1

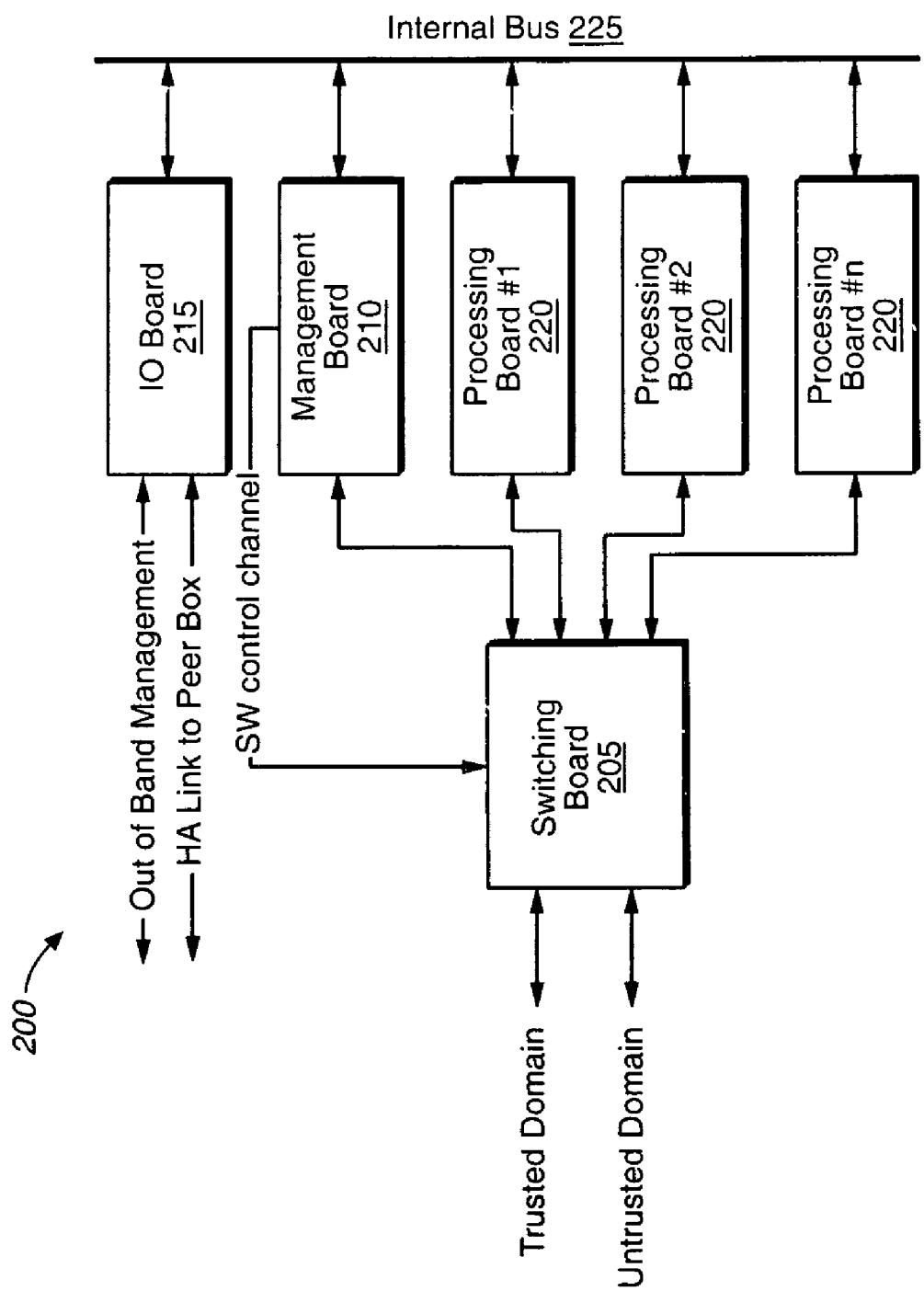
FIG._2

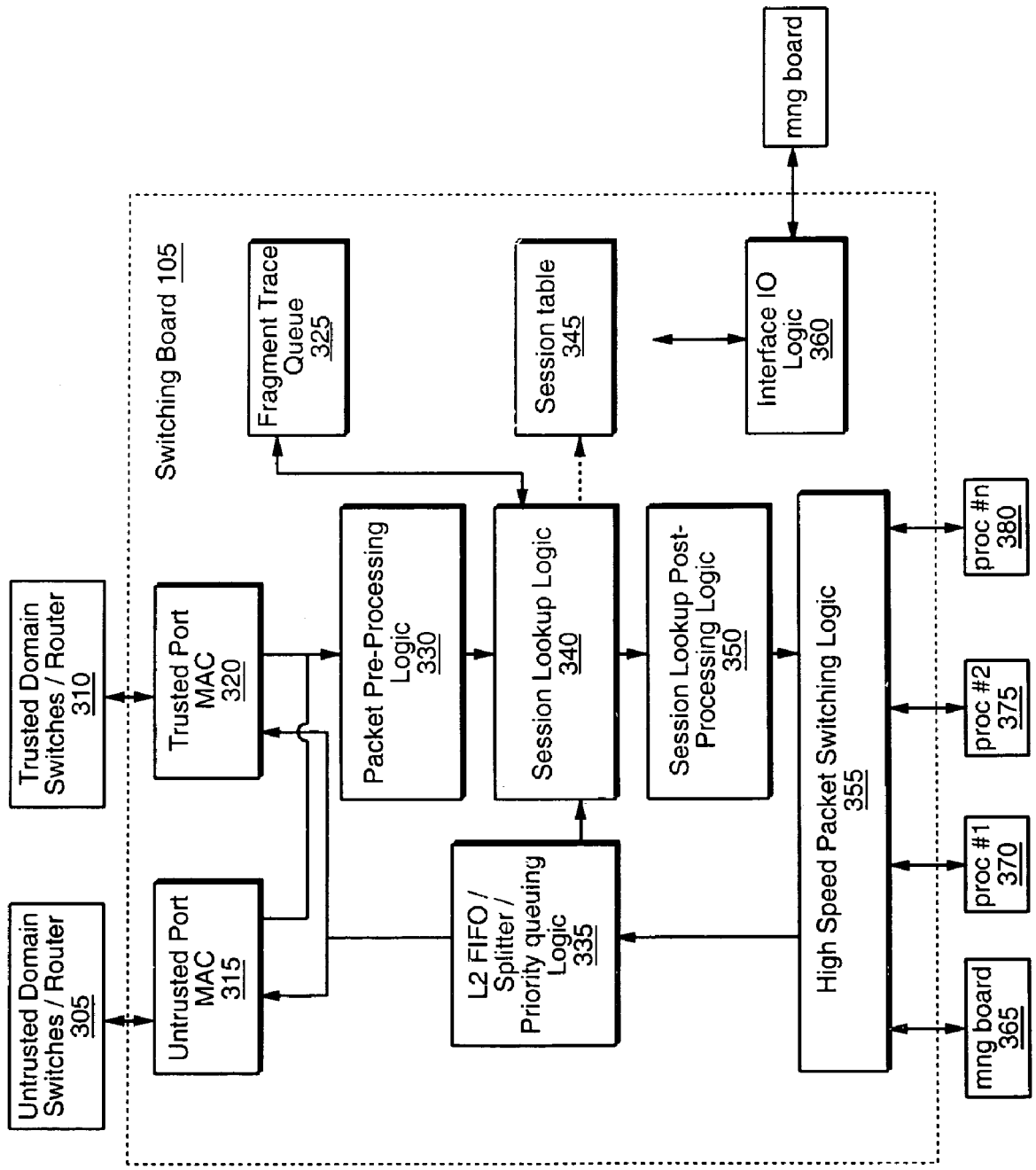
FIG._3

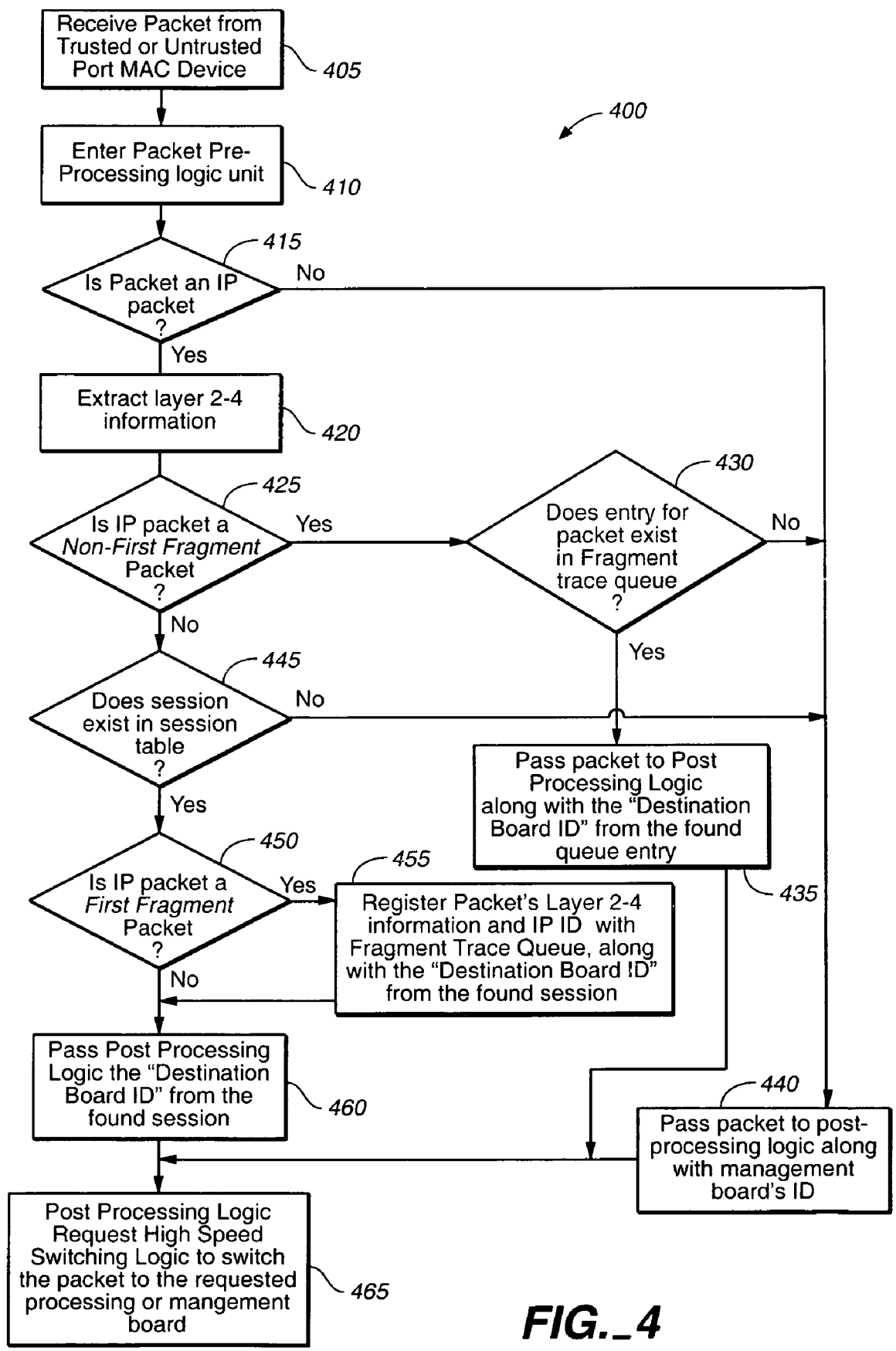
FIG._4

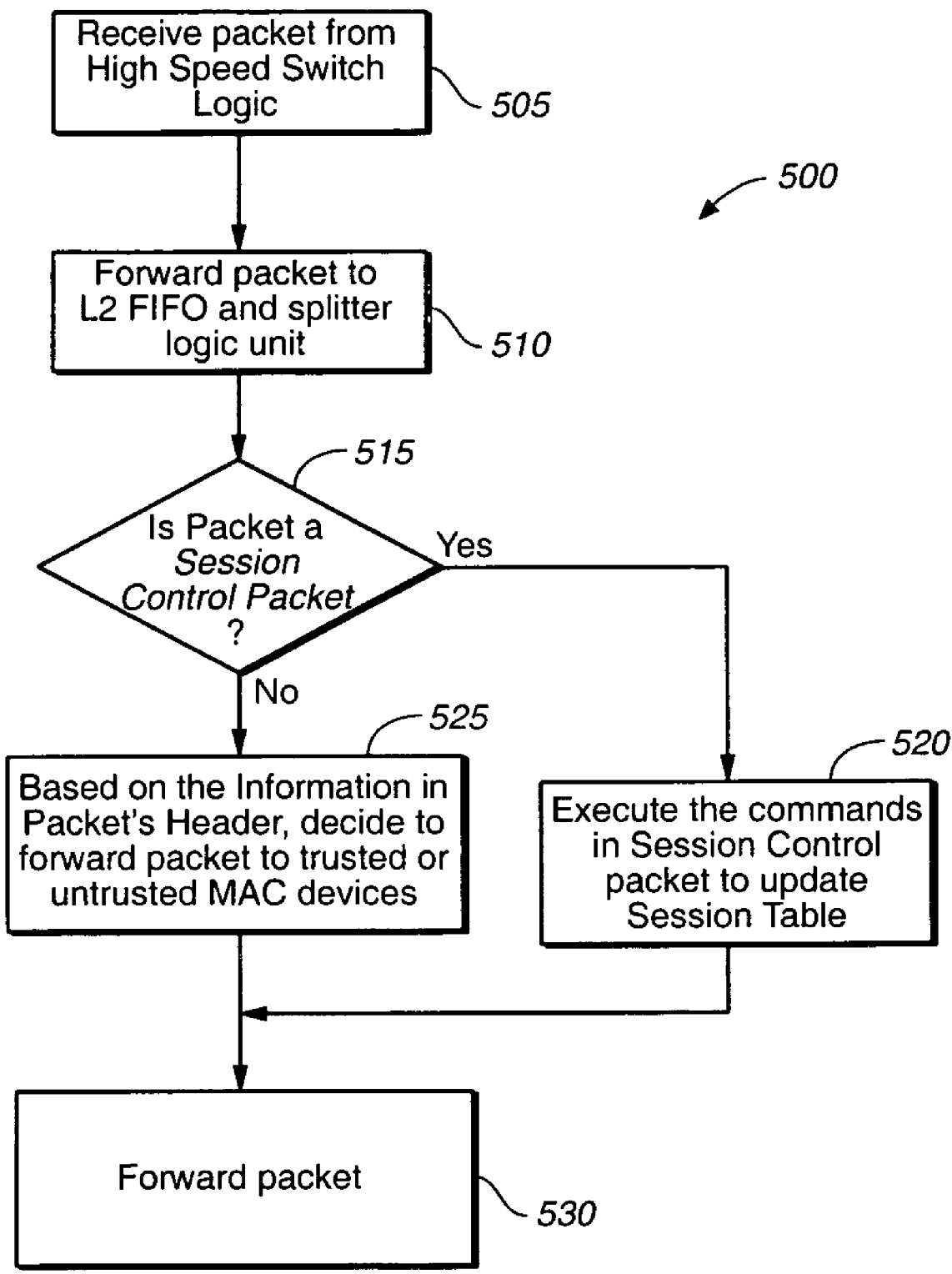
FIG._5

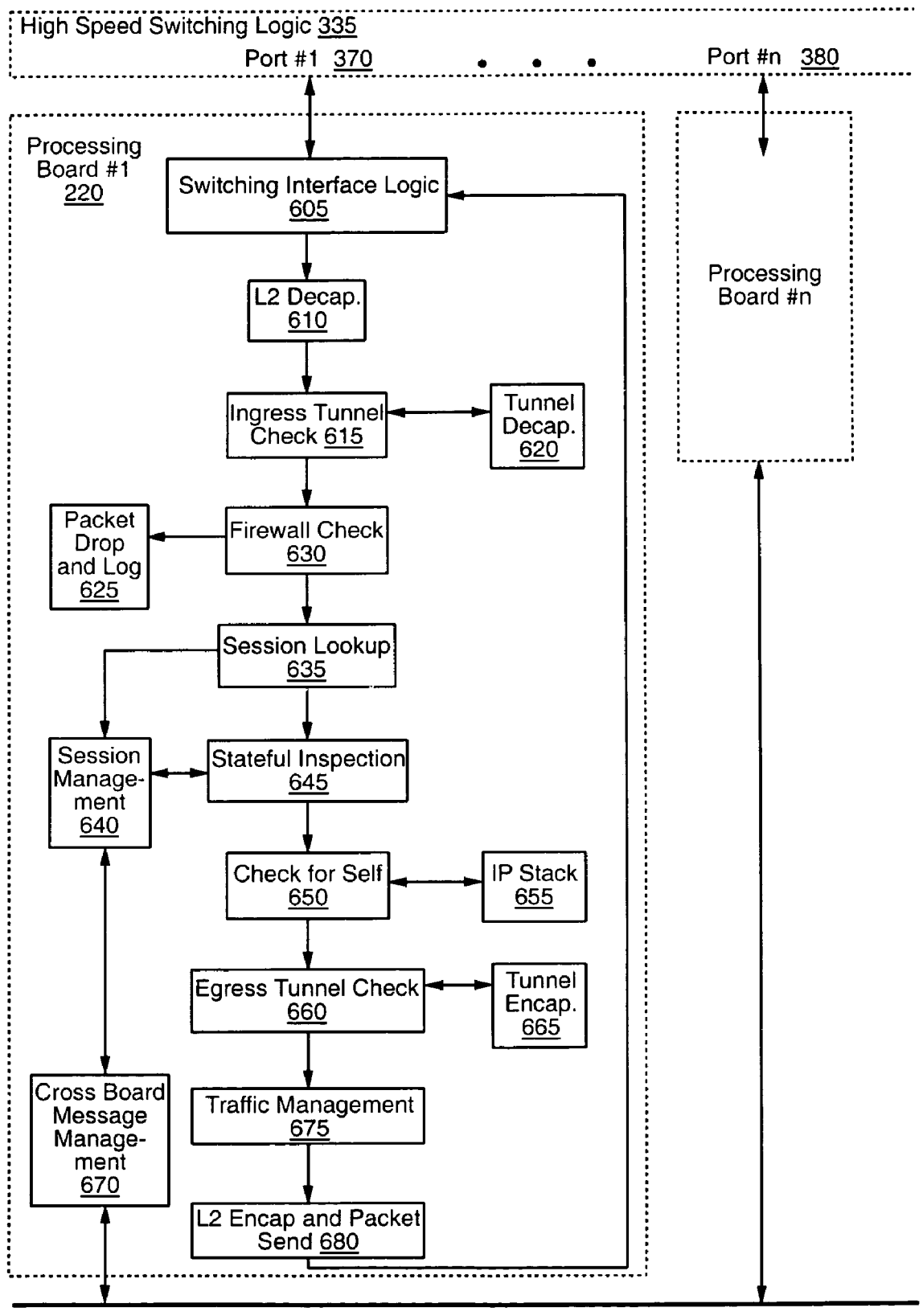
FIG._6A

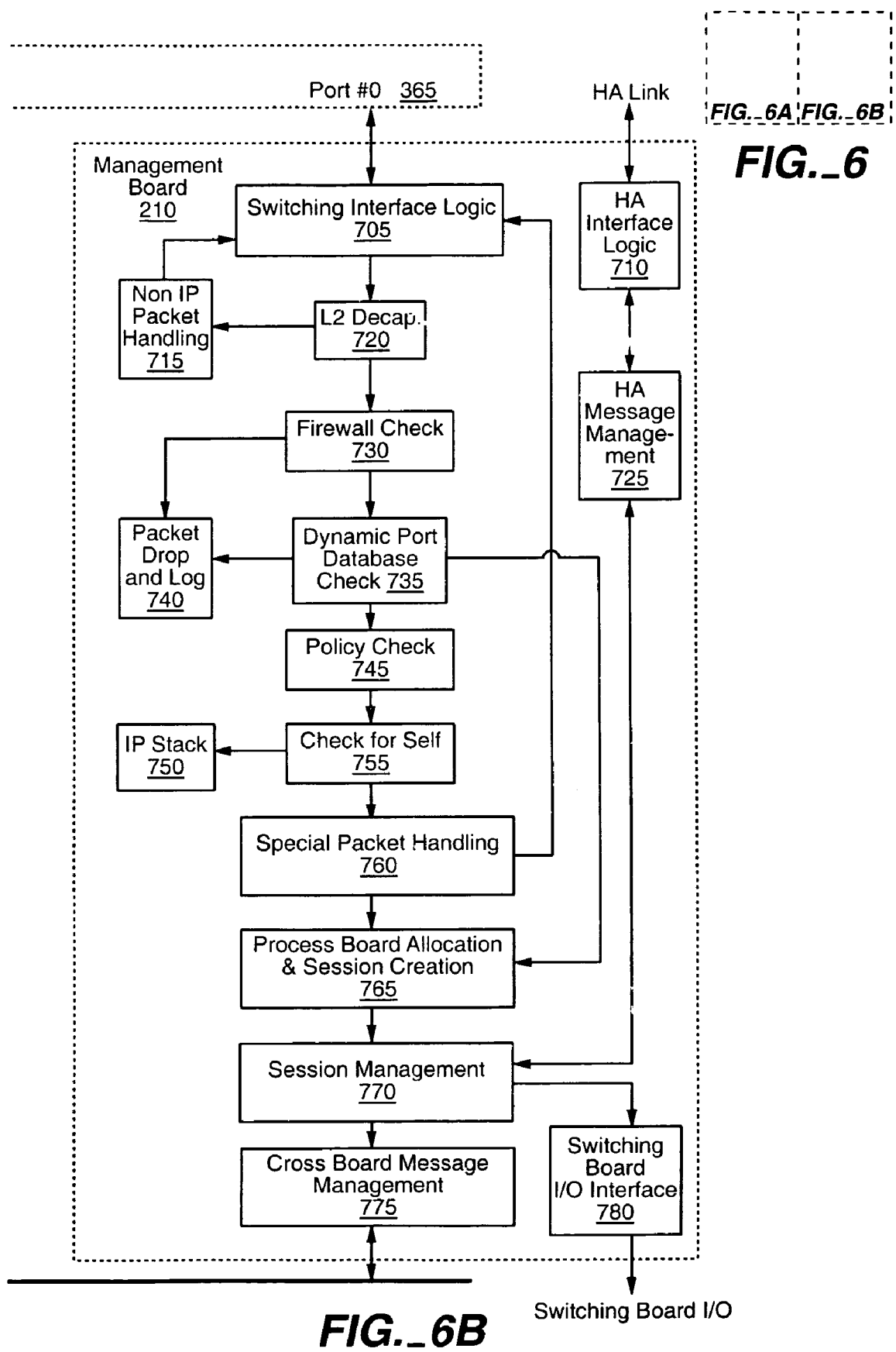
FIG._6B

INTERNET SECURITY DEVICE AND METHOD

CROSS-REFERENCE TO RELATED APPLICATIONS

This application claims the benefit of prior U.S. provisional application 60/280,684, filed Mar. 30, 2001.

BACKGROUND

The invention relates to an Internet security system. There are many emerging trends in the communications world, including the increase in network technology and the proliferation of data networks. One example of a data network is a packet switch communication system. A conventional packet switch communication system includes one or more routers connecting a plurality of users. A packet is the fundamental unit of transfer in the packet switch communication system. A user can be an individual user terminal or another network. A router is a switching device which receives packets containing data or control information on one port, and based on destination information contained within the packet, routes the packet out another port to the destination (or intermediary destination). Conventional routers perform this switching function by evaluating header information contained within the packet in order to determine the proper output port for a particular packet.

The network can be an intranet, that is, a network connecting one or more private servers such as a local area network (LAN). Alternatively, the network can be a public network, such as the Internet, in which data packets are passed over untrusted communication links. The network configuration can include a combination of public and private networks. For example, two or more LAN's can be coupled together with individual terminals using a public network such as the Internet. When public and private networks are linked, data security issues arise. More specifically, conventional packet switch communication systems that include links between public and private networks typically include security measures for assuring data integrity.

To ensure security of communications, network designers have either incorporated security appliances, such as firewalls and traffic management devices in their systems or enhanced their routers with these functionalities. A firewall is an Internet security appliance designed to screen traffic coming into and out of a network location. A virtual private network provides a secure connection through a public network such as the Internet, between two or more distant network appliances using virtual private networking technology. In many cases, such appliances, although necessary from a security point of view, tend to act like bottlenecks in the network in terms of throughput.

SUMMARY

In general, in one aspect, this invention provides methods and apparatus, including computer program products, implementing and using techniques for processing a data packet. An input port receives a data packet, a switching board classifies the data packet, determines whether the data packet should be accepted, and switches the data packet to a management board if the data packet is a first data packet in a session, and to a processing board if the data packet is not a first data packet in a session. A management board receives a data packet from the switching board, examines the data packet and forwards the data packet to one of the processing boards. One or more processing boards receives non-first data packets from the switching board and data packets from the management board and processes the data packets.

Advantageous implementations can include one or more of the following features. The classification of the data packet by the switching board can include determining if the data packet is an IP packet. The switching board can switch the data packet to the management board if the data packet is not an IP packet. If the data packet is an IP packet, the switching board can extract IP information from the data packet and determine if the data packet is a first data packet in a session. The IP information extracted from the data packet can include one or more of VLAN, IP source address, IP destination address, IP protocol number, IP identification number, and transport layer information. Switching the data packet based on the classification can include switching the data packet to a processing board, if the data packet is a non-first IP packet. The switching board can switch a non-first fragment IP packet to a processing board based on queue entries for a corresponding first fragment IP packet in a fragment trace queue on the switching board.

The management board can examine the data packet by performing one or more of the following checks on the data packet: a firewall check, a dynamic port database check, and an access policy check. The management board can forward the data packet by determining a current load on all processing boards and forwarding the data packet, based on the determined current load on all processing boards, to one of the processing boards. The data packet can be forwarded to the processing board having a lowest load. The management board can forward the packet to a processing board based on a user-selected criterion. The number of switching boards, management boards and processing boards can be configurable by a user. The checks performed on a data packet can be configurable by a user. The device can be an Internet security device. Two or more processing boards can be included that can process data packets in parallel. The one or more processing boards can process the received data packets by performing one or more of: policy enforcement, virtual private network traffic encryption and decryption, key negotiation, firewall protection, network address translation, tunnel encapsulation and de-capsulation, and hot backup between processing boards.

In general, in another aspect, this invention provides methods and apparatus, including computer program products and a firewall device, implementing and using techniques for processing a data packet. An input port receives a data packet. A switching board classifies the data packet, determines whether the data packet should be accepted by the firewall device, and switches the data packet to a management board if the data packet is a first data packet in a session, and to a processing board if the data packet is not a first data packet in a session. A management board receives a data packet from the switching board, performs a firewall check on the received data packet, examines the data packet, and forwards the data packet to one of the processing boards. One or more processing boards receives non-first data packets from the switching board and data packets from the management board, and processes the data packets.

In general, in one aspect, this invention provides methods and apparatus, including computer program products and a secure gateway with firewall and virtual private network functionality, implementing and using techniques for processing a data packet. An input port receives a data packet. A switching board classifies the data packet, determines whether the data packet should be accepted by the gateway, and switches the data packet to a management board if the data packet is a first data packet in a session, and to a processing board if the data packet is not a first data packet in a session. A management board receives a data packet from the switching board, performs a firewall check on the received data packet, examines the data packet, and forwards the data packet to one of the processing boards. One or more processing boards receives non-first data packets from the switching board and data packets from the management board, and processes the data packets, the processing including virtual private network traffic encryption and decryption.

The invention can be implemented to realize one or more of the following advantages. A high-performance parallel processing system is provided for securing enterprise intranets, e-business operations and high-speed Internet access. The system includes a stateful-inspection firewall and VPN features and is built on a resilient platform that offers scalable resources targeting large enterprises and service providers. Parallel processing together with a fast firewall and encryption acceleration engine deliver high performance needed for broadband data applications. Service providers, such as Internet data centers (IDC), application infrastructure providers (AIP) and metropolitan area networks (MAN), can use the security systems to protect their infrastructures, and also as a basis for "in the cloud" managed security offerings. A scalable system architecture assures that customers are able to meet increasing bandwidth requirements using a single device. The system can be easily integrated into various types of environments with different requirements.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1 is a schematic view of an environment in which a security device can be deployed.

FIG. 2 is a schematic view of a security device.

FIG. 3 is a schematic view of a switching board of the security device of FIG. 2.

FIG. 4 is a flowchart showing how an incoming packet is processed by the switching board of FIG. 3.

FIG. 5 is a flowchart showing how an outgoing packet is processed by the switching board of FIG. 3.

FIG. 6 is a schematic view of the architecture and operation of a processing board and management boards.

Like reference symbols in the various drawings indicate like elements.

DETAILED DESCRIPTION

An Internet security device (200) in accordance with the invention can, for example, be applied in a computer network environment (100) such as the one shown in FIG. 1. A number of users (110, 115, 120) are connected to a wide area network (WAN) (105), such as the Internet. The users may be individuals or different types of entities, such as corporations or universities. Some users (110) can be connected directly to the wide area network (105), while others are connected through some subnet, such as a local area network (LAN) (125) or a virtual network in which an administrator has defined a group of users as a single subnet. Information travels between the different users, entities, and groups as packets. An Internet security device (200) can be used to control what traffic passes between networks or users, for example, between the WAN (105) and an individual user (115) or between the WAN (105) and the LAN (125) to which one or more users (120) are connected. The Internet security device (200) can be configured to either protect the single user (115) or an entire network, such as LAN (125) and the users (120) who are connected to the LAN (125), or a defined user group operating on the LAN (125). Protection includes inspecting, screening and monitoring incoming and outgoing packets, including detecting, intercepting and dropping unwanted packets in accordance with defined policies. The policies can be pre-set by the user (115) or a network administrator. The Internet security device (200) will now be described in further detail, by way of example.

As can be seen in FIG. 2, an Internet security device (200) in accordance with one implementation of the invention includes a switching board (205), a management board (210), an I/O board (215), and several processing boards (220). The boards are installed in a single chassis box and communicate with each other through one or more internal buses (225). The security device (200) is modular and additional resources can be added to increase performance. The different boards and the function of each board in the security device (200) will now be described in further detail.

The Switching Board (205)

FIG. 3 shows a more detailed schematic view of the switching board (205). The switching board (205) receives and processes incoming packets from the WAN (105) or LAN (125) and determines for each packet if the packet should be forwarded to the management board (210) or to a processing board (220) in the security device (200). The switching board (105) includes the following components. A trusted domain switcher/router port (310) and an untrusted domain switcher/router port (305), are used to receive packets. A packet pre-processing logic unit (330) is used to examine if a packet is an IP packet. A post-processing logic unit (350) is used to switch packets to a management board port (365) on a high-speed packet switching logic unit (355). A session lookup logic unit (340) is used to determine if a packet is a non-first fragment packet using a session table (345). A fragment trace queue (325) contains queue entries relating to packets that have passed through the Internet security device, thereby enabling non-first fragment IP packets to pass straight to a proper processing board (370, 375, 380). An interface I/O logic component (360) handles the communication between the management board (210) and the switching board (105). A layer 2 FIFO, splitter and priority queuing logic unit (335) is used to buffer packets, determine if a packet is a session control packet, and queue packets in a priority queue so that certain packets get priority over others. The priority mechanisms for the priority queue can be configured by a system user according to any criterion he or she may select. For example, control packets can have priority over normal packets. The priority queuing mechanism ensures quality of service and high throughput.

FIG. 4 shows a schematic flowchart of a process (400) describing how an incoming packet is routed through the switching board (205) to a processing board (370, 375, 380) or to a management board (365). The process starts by receiving a packet from the LAN (125) or WAN (105) in FIG. 1. The packet is received using a trusted port media access connection (MAC) (320) or an untrusted port MAC (330) from either the trusted domain switcher/router port (310) or from the untrusted domain switcher/router port (305), respectively (step 405). The packet first enters the packet pre-processing logic unit (330) (step 410). The packet pre-processing logic unit examines if the packet is an IP packet (step 415). If the packet is not an IP packet, then the packet is forwarded to the post-processing logic unit (350) (step 440), which switches the non-IP packet to the management board port (325) on the high-speed packet switching logic unit (355) (step 465), which ends the process.

If the packet pre-processing logic unit (330) in step 415 determines that the packet is an IP packet, all the layer information is extracted from the data packet (step 420). The layer information in the packet includes a VLAND ID, if present, in layer 2; IP source address and destination address, IP protocol number and IP ID in layer 3; and transport layer identification information, such as TCP/UDP source port and destination port, ESP/AH SPI number, and PPTP/L2TP call ID in layer 4.

The packet then passes to the session lookup logic unit (340), which determines if the header of the IP packet indicates that the packet is a non-first fragment packet (step 425). If the packet is a non-first fragment packet, the packet's layer information (in one implementation the IP source address, IP destination address and IP ID, along with the VLAN ID, if present) is used to check if a corresponding queue entry exists in the fragment trace queue (325) (step 430).

If a queue entry is found, then the packet is sent through the post-processing logic unit (350) and high speed packet switching logic unit (355) to the port indicated by the queue entry (step 435). If no queue entry is found, the packet is sent to the management board port (325) (step 440).

Returning now to step 425, if the process decides that the IP packet is not a non-first fragment packet, that is, the packet is a first fragment IP packet, the packet is sent to the session lookup logic unit (340), where the process searches a session recorder in a session table (345) to find an associated session (step 445). In one implementation, the information used to search the session table is the extracted layer 2–4 information, that is, VLAN ID, source IP, destination IP, protocol number, source port and destination port. If no session is found, then the packet is forwarded to the management board port (325) (step 440).

If there is a session that matches the packet information, the process checks if the packet is a first fragment of a fragmented IP packet (step 450). If so, the process registers the packet's layer 2–4 information (that is, source IP, destination IP, protocol number) and IP ID with the fragment trace queue (325) along with the target port number found in the session entry (step 455), so that any subsequent non-first fragment IP packet can pass straight to the correct processing board.

If it is decided in step 450 that the packet is not a first fragment packet, the packet is sent through the session lookup post-processing logic unit (350). Here the destination board ID from the found session is used (step 460) to instruct the high-speed packet switching logic unit (355) to forward the packet to the port number indicated in the matching session's target port field. Finally, the high-speed packet switching logic unit (355) switches the packet to the requested processing board (step 465). This completes the processing of incoming packets on the switching board (105).

FIG. 5 is a flowchart showing a process (500) for how an outgoing packet is processed by the switching board (105) in FIG. 3, that is, a packet coming into the switching board (105) from one of the processing board ports (330–340) that is destined for the untrusted domain switch/router (305) or the trusted domain switch/router (310). The process begins with the receipt of the outgoing packet by the high-speed packet switching logic unit (355) from one of the processing boards (120) through one of the processing ports (330–340) (step 505).

The outgoing packet from the high-speed packet switching logic unit 355 is forwarded to the L2 FIFO, splitter and priority queuing logic unit (335) (step 510). The L2 FIFO, splitter and priority queuing logic unit (335) buffers the packet and determines if the packet is a session control packet (step 515). In one implementation, the splitter classifies different packet types based on the Ethernet type field in the layer 2 Ethernet header. In one implementation, the received packet is a session control packet if the packet carries a special MAC type value. The process then sends the session control packet to the session lookup table (340), where commands in the session control packet are executed and the entries in the session table are updated (step 520).

If the packet is not a session control packet, then the splitter decides to which MAC port the packet should be forwarded (step 525). In one implementation, the splitter looks at the packet's source MAC address inside the layer 2 Ethernet header to decide to which MAC port the packet should be forwarded. Finally the packet is forwarded to the determined location (step 530), which ends the process.

The Management Board

As was described above, the management board (210) receives and processes the first packet in a session, as well as any packets that cannot be directly switched to any of the processing boards (220). The handling of the first packet on the management board (210) can include packet classification, policy lookup, session setup (including VPN sessions), load balancing (the session loads to different processing boards), synchronizing session state information with the switching board and high availability (HA) peers, and handling management tasks. All of these tasks will be described in further detail below.

The processing board (220) and the management board (210) are schematically depicted in FIG. 6 as part of a high-level system architecture that shows the interconnection of the boards. The management board (210) contains the following components. A switching interface logic unit (705) is connected to the High Speed Packet Switching Logic unit on the switching board (205) and receives packets to be processed.

Packet classification includes the extraction of layer information and "typing" of a packet. A layer 2 de-capsulation unit (720) extracts layer information about a packet from a layer 2 portion of the packet header. A non-IP Packet Handling unit (715) handles packets that are not IP packets. How non-IP packets are handled is discussed in greater detail below.

The policy lookup operations can include a firewall inspection including the enforcement of global and local policies. A Firewall Check Engine (730) checks packets for attacks configured by a system user. A log (740) contains information about possible attacks. An Access Policy check unit (745) can be initiated for access policies created by a firewall administrator. A special packet handling unit (760) performs various types of checks on packets, for example, whether a packet's TTL (time to live) value has reached zero.

Session set-up includes creation of new sessions for each first packet received that is identified to be part of a session. Certain live session applications may create other, dynamic sessions, for example, an FTP por command can require a session to be created. A dynamic port database check unit (735) contains dynamic session information for dynamic sessions that is created by such live session applications. A new session creation unit (765) is used to create new sessions. Session state information is synchronized with the switching board and other high availability (HA) peers to speed the processing of packets through the system. A cross board message management unit (775) is used to send session creation messages to a selected processing board. The cross board message management unit (670) on the target processing board is responsible for notifying the session management unit (640) on the processing board (220) of a session creation, so the session management unit (640) in turn can create a local session record on the target processing board (220). A switching session table (345) on the switching board (205) is used by a switching board I/O interface (780) on the management board (210) to notify the switching board (205) about a session creation and a new home processing board number for the session. A session management unit (770) removes a session entry from the session database, creates a log of sessions that have finished, and notifies the switching session table (345) of the removal.

A packet testing unit (755) is used to see if a packet is addressed to the system itself. An IP stack (750) on the management board (210) contains information for packet processing.

As can be seen from FIG. 6, the flow of data in the management board (210) starts with a data packet entering the switching interface logic unit (705) from the high speed switching logic port #0 (325) that is connected to the High Speed Packet Switching Logic unit on the switching board. (205)

The data packet continues to the layer 2 de-capsulation unit (720) where layer information about the packet is extracted from layer 2. Layer 2 contains the VLAN ID information. The extracted layer 2 information is used to check if the packet is designated for this system. If the layer 2 information shows that the packet is not designated for the system, the packet is to be dropped and the data packet flow for this packet ends. If the layer 2 information shows that the packet is designated for the system, the management board (210) checks the layer 3 information (that is, the IP source address, the IP destination address, and the IP protocol number) to see if the packet is an IP packet. If the packet is a non-IP packet, the packet is to be sent to the NON-IP Packet Handling unit (715) for further processing. Such processing includes ARP (address resolution protocol) handling, NSRP (Netscreen Redundancy Protocol) messaging, and so on.

If the packet is an IP packet, the packet is sent to a Firewall Check Engine (730) that checks the packet. In one implementation, the packet is screened for attacks configured by a system user. The checks can include, but are not limited to, detection of so-called "Port Scan," and "Ping of Death," attacks. If any of these attack types are detected, the packet is interpreted to be an attempted attack to the system and is therefore dropped and logged together with the attack information (740).

Some of the layer 2, layer 3 and layer 4 information can be carried along with the packet as the packet moves among the units on the management board (220). This information includes: VLAN ID from layer 2, if a VLAN ID is present; IP source address, destination address, and protocol number, from layer 3; and TCP/UDP source port number, destination port number, from layer 4. The information can uniquely identify a network traffic connection (session).

After the firewall check is completed, the data packet passes through a dynamic port database check (735). The dynamic port database contains the dynamic session information that is created by certain live session applications. One example of such an application is an FTP application. When an FTP connection starts (FTP control session), an FTP data tunnel session may be dynamically initiated from the FTP server by a command in the FTP control session. In order to capture such session creation, an entry must be dynamically created in the database once such command is encountered on the FTP control session. This allows a data session initiated from the FTP sever to be matched once it arrives and the system can correctly create a new session (765). Once a session matches a record, that matching record is removed from the dynamic database. If no session matches are detected for a given record (that is, over a predetermined time span), the record is automatically removed by system as well.

If no match is found in the dynamic database, an Access Policy check (745) is initiated for any access policies created by a firewall administrator. The policies typically contain rules about what kinds of traffic should be allowed and how the traffic should be managed. For example, a policy can state "From Host A to web server B, all HTTP traffic is allowed." If there is no policy matching the session information, or the policy indicates a deny action, the packet is dropped and logged. Otherwise, the packet is tested (755) to see if the packet is addressed to the system itself. Such traffic includes, for example, network management packets. If the packet is addressed to the system itself, the packet is copied to the IP stack (750) on the management board (110) for further processing. If the packet is not addressed to the system itself, a check for special packet handling (760) is performed, for example, to check whether the packet's TTL (time to live) value has reached zero. A session is then created using policy information to enforce the stateful inspection for all the packets that belong to the session. (765).

The session creation includes three steps: In a first step, a session record is created in the management board session database (765). In a second step, one of the available processing boards is selected to host the session. In one implementation, a processing board (220) is selected based on the current load on the respective processing boards. In one implementation, a processing board (220) is selected in such a way that the load be distributed as evenly as possible across all the processing boards. After a processing board has been selected, a session creation message is issued along with all fatal session information and the data packet itself. The session creation message is then sent to the selected processing board using the cross board message management unit (775). Each processing board (220) includes a cross board message management unit (670). The cross board message management unit (670) on the target processing board (220) is responsible for notifying the session management unit (640) on the processing board of a session creation, so the session management unit (640) in turn can create a local session record on the target processing board (220).

In a third step, the session management unit (770) sends a command to the switching session table (345) on the switching board (205), using the switching board I/O interface (780) to notify the switching board about the session creation and the new home processing board number for the session. Thereby, the following packets on the session can be correctly directed to the selected processing board (220).

Where there is a session creation, there is also a session removal once the session lifetime is up. The session removal action is initiated from the selected processing board (220). Once the stateful inspection engine (645) on a processing board (220) detects a session close, the stateful inspection engine (645) notifies the session management unit (640), which creates a delete session command and sends the delete session command to the session management unit (770) on the management board (210) through the cross board message management units (670, 775). Upon receiving such commands, the session management unit (770) removes the session entry from the session database, creates a log of session finished and notifies the switching session table (345) on the switching board (205) of the removal. This completes the description of the data flow for the data packet on the management board (210).

The Processing Board

Turning now to the processing boards (220), as was mentioned above, the Internet security device (200) may include several processing boards (220). The scalability aspect of the Internet security device (200) makes it possible for a user or administrator of the Internet security device (200) to add as many processing boards as needed in order to achieve desired performance and throughput. Each of the processing boards (220) receives packets from the switching board (205). The packets are part of a session that has been identified and created in accordance with the management board (210). The processing boards (220) handle tasks such as policy enforcement, VPN (Virtual Private Network) traffic encryption and decryption, key negotiation, firewall protection, NAT (Network Address Translation) and hot backup between boards. These tasks will be described in further detail below.

In order to simplify the description, only one processing board flow will be described here by way of example. Each processing board (220) has the same characteristics in the described implementation of the invention. Further, it is assumed that the first packet in a session has been processed by the management board (210), so that the switching board (205) has been made aware of where (i.e., to which processing board (220)) to send all subsequent packets in a given session.

In one implementation, all the processing boards (220) are identical to each other, from both physical and firmware points of view. Since the processing boards (220) have the same configuration, if one processing board fails, another board (or combination of boards) can easily take over the tasks of the failed processing board (220). However, during normal operation, each processing board (220) is responsible for processing only the sessions that have been assigned by the management board (210). If a processing board (220) receives an "unrecognized packet," the processing board (220) returns the packet to the management board (210) for further investigation.

In one implementation, each processing board (220) contains the following components. A high speed switching logic port #1 (315) receives packets from a switching interface logic unit (605). A layer 2 de-capsulation unit (610) extracts layer 2 information to check if a packet is designated for the system. A traffic management unit (675) enforces a matching traffic management policy configured by a system administrator. A layer 2 encapsulation and send unit (680) is used to encapsulate and send a packet out from the processing board (220).

An ingress tunnel check unit (615) is used to find a proper tunnel for a packet. A decode unit (620) is used to call the de-capsulation vector from the tunnel to decode encrypted octals back to a plain IP packet (620). An egress tunnel check unit (660) checks if the packet is addressed to an egress tunnel. A tunnel encapsulation unit (665) encrypts data packets so that packets can reach a target through a defined tunnel.

An IP firewall attack check unit (630) is used to check packets for attacks or illegal information. A packet information log (625) is used to log dropped packets. A local session table (635) is used to keep track of sessions handled by the processing board (220). A check for self unit (650) is used to check if a packet is addressed to the system itself.

A stateful inspection engine (645) tracks the session state of a packet; monitors dynamic session creation and closing and other irregularities of the packet flow, at high network layers, such as application layers, and so on. A session management unit (640) sends messages to the management board session management unit through a cross board message management unit (670, 775).

The data flow in processing board #1 (220) starts when a data packet enters the switching interface logic unit (605) from the high speed switching logic port #1 (315). Just like in the management board data flow, the packet passes through a layer 2 de-capsulation unit (610) where the layer 2 information is extracted to check if the packet is designated for the system. If the packet is designated for the system, all the necessary layer 2, layer 3 and layer 4 information is extracted out of the data packet and carried along with the packet throughout the packet processing. In one implementation, the extracted information includes: VLAN ID from layer 2, if it is present; IP Source Address, Destination Address and Protocol Number from layer 3; TCP/UDP source port number and destination port number, ESP/AH protocol SPI number, and GRE protocol call ID from layer 4.

The data packet received by the processing board can be encapsulated by a tunnel. One example is IPSec encrypted VPN traffic. When VPN tunnels are used, only the VPN tunnel for which the packets are intended can decrypt the packets and recover the packets to obtain the meaningful data packets. The Internet security device (200) builds all the mechanisms required to support the VPN tunnel. Once a packet comes in to the processing board (220), an ingress tunnel check unit (615) finds the proper tunnel for the packet, and calls the de-capsulation vector from the tunnel to decode the encrypted octals back to a plain IP packet (620). Once the packet has been decoded, the IP, TCP/UDP layer 3 and layer 4 data is updated to regenerate the IP packet for transmission to its intended recipient.

Once the all the tunnel encapsulations (if there are any) have been removed, an IP firewall attack check (630) can be applied to the packet. If any attack or untrusted information is found in the packet information, then the packet is dropped and logged as irregular (625).

Next, the system discovers the session context for the incoming packet by performing a look-up operation using the local session table (635) of the processing board (220). As was mentioned in the management board data flow description above, the session context is created by commands from the management board (210) when the management board (210) encounters a new session stream in the management board's data flow. In most cases, the session context is found successfully, but in a case where no session can be found, the packet is sent to the management board (210) for further investigation (640, 670).

Once the system has the session context, stateful inspection can be conducted on the packet (645). The stateful inspection can include tracking the session state of the packet; monitoring dynamic session creation and closing and other irregularities of the packet flow, at high network layers, such as application layers, and so on. The stateful inspection engine (645) keeps the session state information updated while the packet flows through the processing board (220). If the stateful inspection engine (645) notices a session closing, the stateful inspection engine (645) notifies the session management unit (640), which in turn sends a message to the management board session management unit (770) through the cross board message management unit (670, 775), so that the session database can be updated, and the session in the switching board session table (345) can be freed up. Also, if the stateful inspection engine (645) sees a dynamic session creation event, the stateful inspection engine (645) sends a "dynamic session register" command to the dynamic port database of the management board, so that the future spawned new session traffic can be captured by the dynamic port database checks.

After the packet passes the inspection provided by the stateful inspection engine (645) (e.g., the packet is authenticated), the packet enters a stage for egress processing. First, the packet is checked to determine if the packet is targeted to the stack of the system (650). If so, the packet is forward to the IP stack (655) where the flow ends. Examples for such traffic include IKE (Internet Key Exchange) key negotiation traffic, management traffic, and so on.

The packet then proceeds to the packet manipulation processing, where NAT/PAT (Network Address Translation/Port and Address Translation) is conducted if necessary as indicated by the session context. A NAT/PAT is an operation to replace at least some of the layer 3/layer 4 information with synthesized values, so that a portion of the original packet's information (for example, identities) can be protected.

Next, the packet's outgoing route is determined. For normal traffic, the determination merely involves route table look up and finding the right default gateway for the packet; for other traffic, if there is an egress tunnel associated with the session, the system calls the corresponding tunnel's encapsulation vector (665) to encrypt the data packet so that the packet can reach the target through the defined tunnel. One such example is out going VPN traffic, in which the packet body needs to be encrypted before the packet enters the WAN (105) or LAN (125).

The packet then passes to a traffic management unit (675) where, as appropriate, a matching traffic management policy configured by the system administrator is enforced. Such a policy places the traffic to the proper priority and bandwidth pool, and also limits the maximum bandwidth the packet can consume.

In the last step, the system encapsulates the packet (680) (for example, to an Ethernet packet) and forwards the packet to the transmit interface of the switching interface logic unit (605) to send the packet back to the high speed switching logic unit (355), which in turn forwards the packet to the switch or router connected to the trusted or untrusted domain ports. This completes the description of the processing board (220).

A number of embodiments of the invention have been described. Nevertheless, it will be understood that various modifications may be made without departing from the spirit and scope of the invention. For example, two or more switching boards can be provided, where each switching board processes a fraction of the total number of packets. More than one management board can be provided if the state information is shared between the different management boards. Accordingly, other embodiments are within the scope of the following claims.

What is claimed is:

1. A device for processing data packets, the device comprising:
   an input port operable to receive the data packets;
   a switching board operable to classify the data packets, determine whether the data packets should be accepted by the device, and determine whether each of the data packets is a first data packet in a session;
   a management board operable to receive the data packets from the switching board that were determined by the switching board to be the first data packets in a session, examine the received data packets, and forward the received data packets; and
   one or more processing boards operable to receive data packets from the switching board that were determined by the switching board to not be the first data packets in a session and to receive the data packets forwarded by the management board, and to process the data packets received from the switching board and the management board.

2. The device of claim 1, wherein the classification of the data packets by the switching board includes determining if the data packets are IP packets.

3. The device of claim 2, wherein the switching board further is operable to switch the data packets to the management board if when the data packets are not IP packets.

4. The device of claim 2, wherein when the data packets are IP packets, the switching board is further operable to:
   extract IP information from the data packets; and
   determine if the data packets are first data packets in a session.

5. The device of claim 4, where the IP information extracted from the data packets include one or more of VLAN, IP source address, IP destination address, IP protocol number, IP identification number, and transport layer information.

6. The device of claim 2, wherein the switching board further is operable to switch a non-first fragment portion of the IP packets to one of the processing boards based on queue entries for a corresponding first fragment portion of the IP packets in a fragment trace queue on the switching board.

7. The device of claim 1, wherein the management board is operable to examine the data packets by performing one or more of the following checks on the data packets: firewall checks, dynamic port database checks, and an or access policy checks.

8. The device of claim 1, wherein the management board is operable to forward the received data packets by
   determining a current load on all processing boards; and
   forwarding the data packet, based on the determined current load on all processing boards, to one of the processing boards.

9. The device of claim 8, wherein the data packets are forwarded to the processing board having a lowest load.

10. The device of claim 1, wherein the management board further is operable to forward the data packets to one of the one or more processing boards based on a user-selected criterion.

11. The device of claim 1, wherein how many of the switching boards, management boards and processing boards present in the device is configurable by a user.

12. The device of claim 7, wherein the checks performed on a data packet are configurable by a user.

13. The device of claim 1, wherein the device is an Internet security device.

14. The device of claim 1, wherein the device includes two or more of the processing boards that are operable to process the data packets in parallel.

15. The device of claim 1, wherein the one or more processing boards is operable to process the received data packets by performing one or more of: policy enforcement, virtual private network traffic encryption and decryption, key negotiation, firewall protection, network address translation, tunnel encapsulation and de-capsulation, or hot backup between processing boards.

16. A firewall device for processing a data packet, the firewall device comprising:
    an input port operable to receive the data packet;
    a management board;
    one or more processing boards; and
    a switching board operable to classify the data packet, determine whether the data packet should be accepted by the firewall device, and switch the data packet to the management board if the data packet is a first data packet in a session, and to one of the processing boards if the data packet is not a first data packet in a session,
    wherein the management board is operable to receive the data packet from the switching board, perform a firewall check on the received data packet, and forward the data packet to one of the processing boards, and
    wherein the one or more processing boards are operable to receive the data packet from the switching board when the data packet is not the first data packet in a session and to receive the data packet from the management board when the data packet is the first data packet in the session, and to process the received data packet.

17. A secure gateway with firewall and virtual private network functionality for processing a data packet, the secure gateway comprising:
    an input port operable to receive a data packet;
    a management board;
    one or more processing boards; and
    a switching board operable to classify the data packet, determine whether the data packet should be accepted by the gateway, and switch the data packet to the management board if the data packet is a first data packet in a session, and to one of the processing boards if the data packet is not a first data packet in a session,
    wherein the management board is operable to receive the data packet from the switching board, perform a firewall check on the received data packet, and forward the data packet to one of the processing boards, and wherein the one or more processing boards are operable to receive the data packet from the switching board when the data packet is not the first data packet in the session and to receive the data packet from the management board when the data packet is the first data packet in the session, and to process the received data packets, the processing including encrypting and decrypting virtual private network traffic.

18. An Internet security device, comprising:
    an input port operable to receive a data packet;
    a switching board operable to:
        classify the data packet, including determining if the data packet is an IP packet, determining whether the packet should be accepted by the device, and determining if the data packet is a first data packet in a session;
        switch the data packet to a management board if the data packet is a first data packet in a session or if the data packet is not an IP packet; and
        switch the data packet to one of one or more processing boards if the data packet is not a first data packet in a session or if the data packet is an IP packets,
    wherein the management board is operable to receive the data packet from the switching board, examine the data packet, including performing one or more of a firewall check, a dynamic port database check or an access policy check on the packet; and forward the data packet to one of the one or more processing boards selected based on a user-customizable criterion; and
    wherein the one or more processing boards are operable to receive non-first data packets from the switching board and data packets from the management board; and process the received data packets.

19. In a security device, a method for processing a data packet, the method comprising:
    receiving data packet;
    classifying the data packet to determine whether the data packet should be accepted by the security device;
    determining if the data packet is a first data packet in a session;
    examining the data packet if the data packet is a first data packet in a session to determine whether the packet should be accepted by the security device;
    switching the data packet to a management board if the data packet is a first data packet in a session, and to a processing board if the data packet is not a first data packet in a session; and
    processing the data packet in the security device if the data packet is accepted.

* * * * *

UNITED STATES PATENT AND TRADEMARK OFFICE
CERTIFICATE OF CORRECTION

PATENT NO.         : 7,095,716 B1                                        Page 1 of 1
APPLICATION NO. : 10/112924
DATED              : August 22, 2006
INVENTOR(S)        : Yan Ke et al.

It is certified that error appears in the above-identified patent and that said Letters Patent is hereby corrected as shown below:

At column 12, line 46, claim 7, "and an" should be removed

At column 14, line 20, claim 18, "packets" should be --packet--

Signed and Sealed this

Seventeenth Day of October, 2006

JON W. DUDAS
*Director of the United States Patent and Trademark Office*